(12) United States Patent
Kremer

(10) Patent No.: US 6,416,087 B1
(45) Date of Patent: Jul. 9, 2002

(54) CONNECTION PIECE WITH SEALING BEAD

(75) Inventor: Paul Kremer, Walferdange (LU)

(73) Assignee: Ueodeux-Ultra Pure Equipment Technology, Lintgen (LU)

( * ) Notice: Subject to any disclaimer, the term of this patent is extended or adjusted under 35 U.S.C. 154(b) by 0 days.

(21) Appl. No.: 09/621,736

(22) Filed: Jul. 21, 2000

Related U.S. Application Data

(63) Continuation of application No. PCT/EP99/00129, filed on Jan. 12, 1999.

(30) Foreign Application Priority Data

Jan. 21, 1998 (LU) .................................................. 90201

(51) Int. Cl.⁷ ........................... F16L 19/02; F16J 15/08; F17C 13/04
(52) U.S. Cl. ....................... 285/328; 285/917; 285/351; 285/379
(58) Field of Search ................................. 285/328, 917, 285/351, 379, 334.2

(56) References Cited

U.S. PATENT DOCUMENTS

| | | | | |
|---|---|---|---|---|
| 1,537,755 A | * | 5/1925 | Dowling | 285/917 |
| 1,848,307 A | * | 3/1932 | Boynton | 285/917 |
| 2,050,137 A | * | 8/1936 | Walsh | 285/917 |
| 2,307,440 A | * | 1/1943 | Wilson | 285/917 |
| 2,528,665 A | * | 11/1950 | Peterson et al. | 285/917 |
| 4,410,186 A | * | 10/1983 | Pierce, Jr. | 285/917 |
| RE33,199 E | * | 4/1990 | Karr, Jr. | 285/917 |
| 5,052,724 A | * | 10/1991 | Konrad et al. | 285/917 |
| 5,118,141 A | * | 6/1992 | Miyashita | 285/917 |
| RE34,144 E | | 12/1992 | Leigh | 277/1 |
| 5,192,095 A | | 3/1993 | Behrens | 285/332.1 |
| 5,529,284 A | * | 6/1996 | Berger et al. | 285/917 |
| 5,720,505 A | * | 2/1998 | Ohmi et al. | 285/917 |

FOREIGN PATENT DOCUMENTS

| | | | | |
|---|---|---|---|---|
| DE | 1247088 | | 8/1967 | |
| FR | 817534 | * | 9/1937 | 285/917 |
| FR | 896049 | * | 2/1945 | 285/917 |
| GB | 1521546 | | 8/1978 | |
| SU | 516867 | * | 6/1976 | 285/917 |

OTHER PUBLICATIONS

Cover Page of WO99/37946 with English Language translation of PCT publication.
Compressed Gas Association Inc(USA)—Outlet Connections for High Integrity Service CGA 630/710 series (Drwg No. 630; edition; CGA V 1, Oct. 1994 (pp. 1, 87,88,89,94, 95).

* cited by examiner

Primary Examiner—Eric K. Nicholson
(74) Attorney, Agent, or Firm—Smith, Gambrell & Russell

(57) ABSTRACT

The invention relates to a connecting branch (10) comprising a replaceable insert part (20) which is placed in a chamber (22) in a sealed manner. Said chamber is open in the front and is located inside the connecting branch (10). A ring-shaped sealing surface having a rotating sealing bead (16) is arranged on the insert part (20). The bead can be pressed into a front surface of an axial sealing ring (14) made of a soft metal, said surface being situated opposite the connecting branch, when coupling a connecting nipple (12) to the connecting branch (10). The insert part (20) is advantageously sealed in the chamber (22) by a second axial sealing ring (32) whose sealing surfaces also having sealing beads (34, 36). The insert part (20) can be merely replaced when the sealing bead (16) is corroded or damaged. As a result, a difficult subsequent fashioning of the standard seal bead (16) on the connecting branch (10) is unnecessary. Such a connecting branch (10) is advantageously used for high-purity gases in the semiconductor industry.

28 Claims, 4 Drawing Sheets

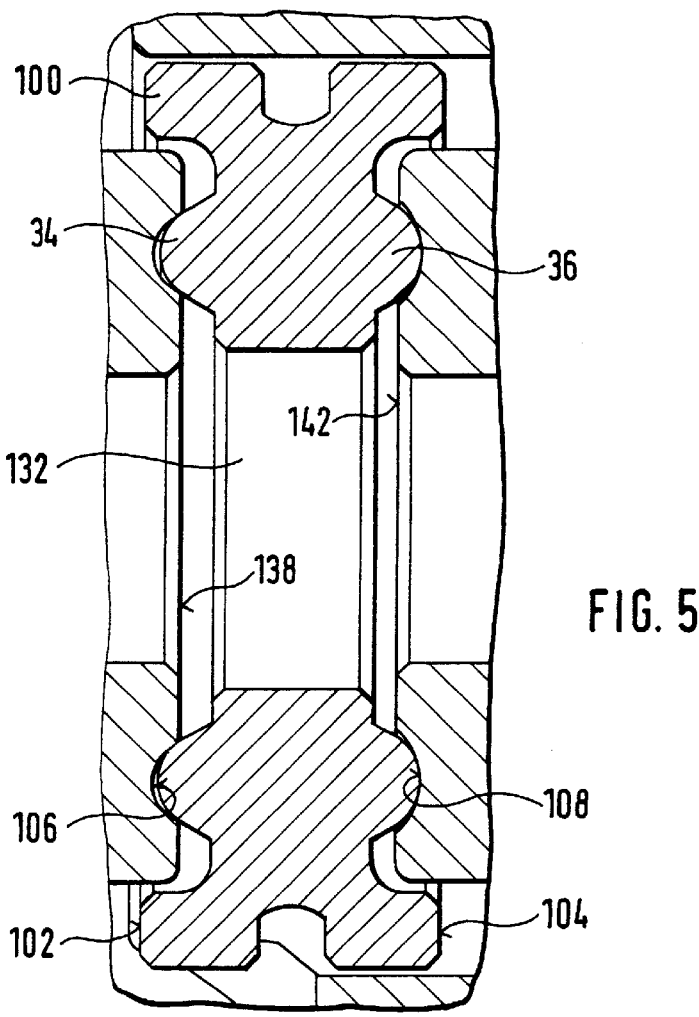
FIG. 5
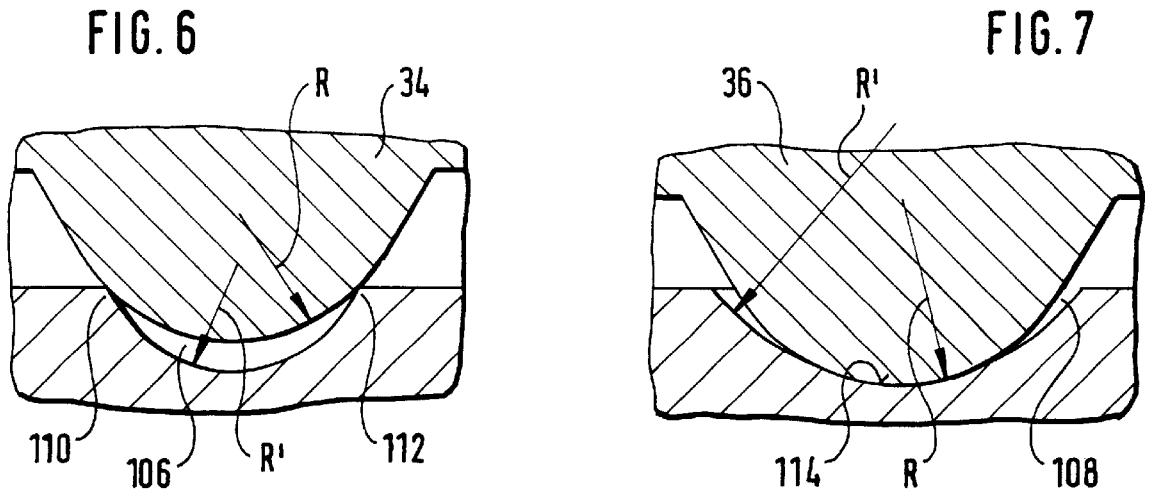
FIG. 6
FIG. 7

CONNECTION PIECE WITH SEALING BEAD

This application is a continuation of PCT/EP99/00129 having an International filing date of Jan. 12, 1999 and which is incorporated herein by reference in its entirety.

The invention relates to a connection piece with a sealing bead.

BACKGROUND OF THE INVENTION

A valve connection piece that has an annular sealing face with an surrounding sealing bead is already known from high-purity gas technology. A connection nipple, which likewise has an annular sealing face with a surrounding sealing bead, can be connected to this valve connection piece. A sealing ring made of soft metal is arranged between the two sealing faces, so that when the connection nipple is connected to the connection piece the two sealing beads are pressed into the two end faces of the sealing ring. Such a coupling system is standardised by the "Compressed Gas Association, Inc." (USA) under the designation "Outlet connections for ultra high integrity service, CGA 630/710 series"(see e.g. data sheets "Drawing No. 630", edition: CGA V-1, October 1994). It is characterised by high tightness and reliability and is therefore used in particular for high-purity gases in the semi-conductor industry.

To prevent any risk of a gas leak in the case of highly toxic, corrosive or pyrophoric gases, the sealing bead is subjected to a stringent check. If, for example, a sealing bead on a valve connection exhibits only slight traces of corrosion, small scratches or minimum damage, which may impair the tightness, the valve is not accepted. In most cases refinishing of the standardised geometry of a damaged sealing bead at acceptable cost is not possible, so that the complete valve is replaced. However, it is expensive and time-consuming to replace the valve in the case of high-purity gases. It is an object of this invention to eliminate or reduce these disadvantages.

SUMMARY OF THE INVENTION

On a connection piece in accordance with the present invention, the sealing bead is formed by an interchangeable insert, which is placed in a sealed manner into a chamber that opens in an end face of the connection piece. If slight traces of corrosion, scratches or damage to the sealing bead of the connection piece are detected during acceptance of a valve, the insert forming the sealing bead is simply changed. Expensive refinishing of the sealing bead on the connection piece is thus dispensed with. A further advantage of the invention is that the insert can be placed in the connection piece just before delivery of the valve. The invention likewise permits preventive interchange of the sealing bead after a certain operating time or during specific interventions. For example, a new insert can easily be placed systematically in the connection piece of a cylinder valve after filling the cylinder. It should also be emphasised that the use of the connection piece with insert according to the invention does not require any modifications to the connection nipples. In other words the use of the invention does not cause any adaptation costs for the final customer.

As the seal between the insert and connection piece need not be standardised, the valve manufacturer has wide scope to design this seal in such a way that the sealing faces in the connection piece, for example, can easily be refinished after withdrawal of the insert. In a preferred embodiment the seal between the insert and connection piece is effected by an axial sealing ring, preferably a metal sealing ring. The latter rests with its first end face against an easily refinishable annular chamber sealing face in the chamber in the connection piece and with its second end face against an annular second sealing face on the insert, at least the first end face of the sealing ring forming a sealing bead. A second sealing bead can be positioned either on the annular sealing face on the insert or, preferably, on the second end face of the sealing ring.

The axial sealing ring is advantageously placed in a sealing ring chamber open at the end in the insert, this sealing chamber being designed in such a way that its first sealing bead does not project from the sealing ring chamber. Consequently it is ensured that this first sealing bead is largely protected against damage before and during assembly of the insert. The annular chamber sealing face is advantageously surrounded by an annular groove, into which the wall of the sealing ring chamber is inserted, so that this chamber sealing face rests against the first sealing bead of the sealing ring.

The seal between insert and connection piece is advantageously augmented by a radially acting sealing element between a rotation-symmetrical surface in the chamber and a rotation-symmetrical surface on the insert. A secondary radial seal of this kind ensures a minimum tightness between the insert and connection piece, if no connection nipple is connected or if the lafter is not screwed tight enough to ensure the effectiveness of the axial sealing ring. It comprises, for example, an O-ring, which is installed in an annular groove in the chamber of the connection piece in such a way that it is sealed against a cylindrical surface of the insert. Alternatively the O-ring could also be arranged in an annular groove of the insert.

In the chamber the insert is advantageously secured by at least one screw, this screw being screwed into the chamber wall and projecting into the chamber at right angles to the central axis of the connection piece. It interacts with a bevelled surface of the insert in such a way that the insert is blocked by the wedge effect of the bevelled surface in the direction of the chamber opening, but is freely movable in the direction of the chamber sealing face.

In an advantageous embodiment the insert has a first cylindrical guide surface, a tapered clamping surface and a cylindrical sealing face, which are arranged in this order from its end with the first sealing bead to its opposite end. The chamber is then advantageously designed as a stepped bore, the cylindrical guide surface being guided in a first step and the cylindrical sealing face sealed in a second step by a radially acting sealing element, the diameter of the first step being larger than the diameter of the second step.

It should be noted that a flow limiter can advantageously be integrated in the insert.

DESCRIPTION OF THE DRAWINGS

Further advantages and features of the invention can be derived from the following description of some exemplified embodiments with reference to the enclosed drawings.

FIG. 5 a section through an alternative sealing ring with sealing beads between two sealing faces;

FIGS. 6 & 7 enlarged details from FIG. 5;

DETAILED DESCRIPTION OF PREFERRED EMBODIMENTS

Figure 1:
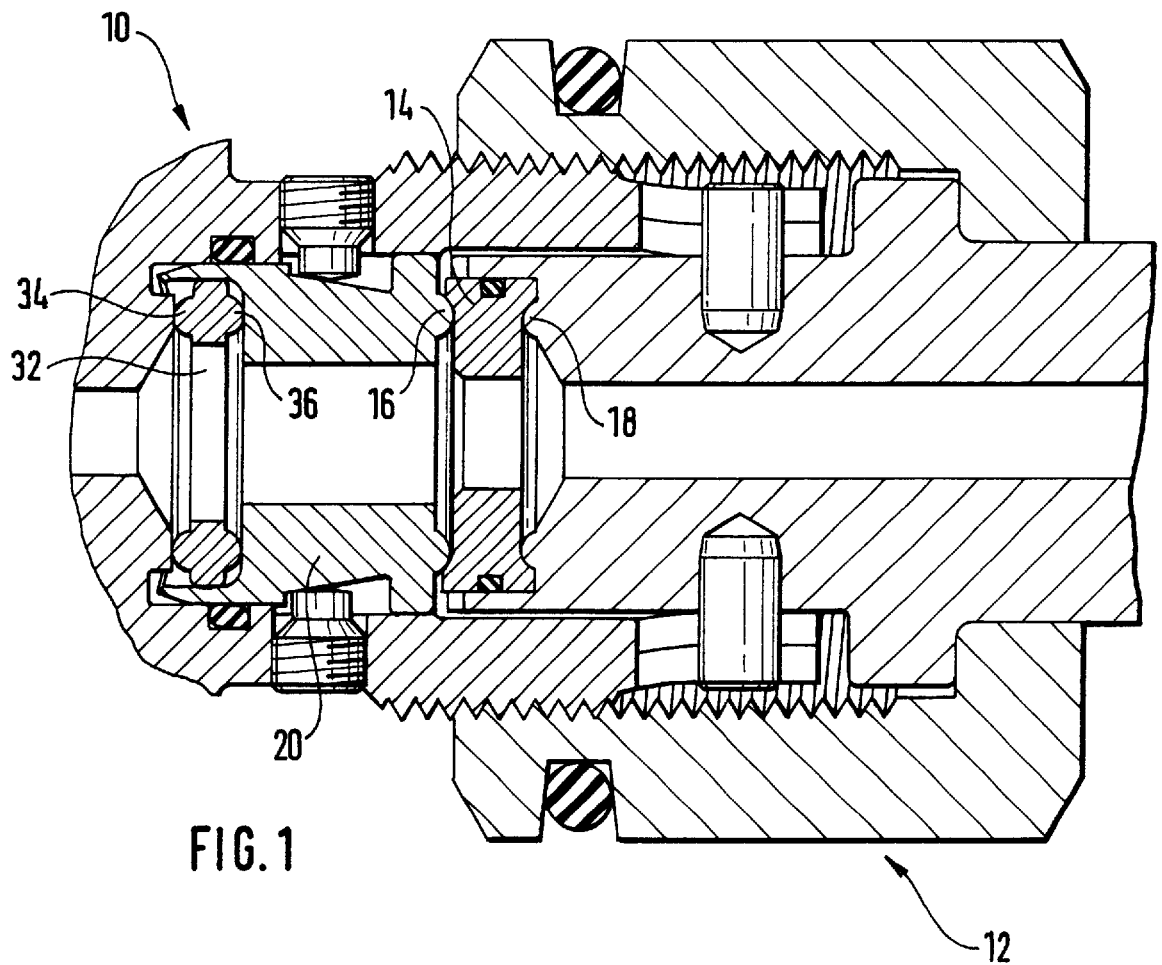
FIG. 1 shows a longitudinal section through a connection piece with coupled connection nipple.

FIG. 1 shows a connection piece 10 of a gas valve with a screwed-on connection nipple 12. The illustrated connection between the connection piece 10 and connection nipple 12, in which the seal is effected by an axial sealing ring-14 made of soft metal (or an alloy), is standardised by the "Compressed Gas Association, Inc." (USA) under the designation "Outlet Connections for Ultra High Integrity Service, CGA 630/710 series". The sealing ring 14 is compressed between two sealing faces, each of the sealing faces having a sealing bead 16, 18, which is pressed into the sealing ring 14 made of soft metal. As already mentioned, excellent tightness is thus achieved, so that this sealing system is particularly suitable for highly toxic, corrosive or pyrophoric gases.

According to the state of the art the sealing bead 16, the geometry of which is specified in detail by the "Compressed Gas Association, Inc.", is incorporated in an annular shoulder surface in a chamber opening into an end face of the connection piece.

According to the invention the annular sealing face with the sealing bead 16 is formed by an interchangeable insert 20. As is shown most clearly in FIG. 3, this insert 20 is sealed into a chamber 22 opening into an end face of the connection piece 10. It consists essentially of a solid of revolution (see also FIG. 2) with a bore 24 in axial extension of a duct 26 in the connection piece 10. The sealing bead 16 is incorporated in the first end 28 of this solid of revolution. At the opposite end the illustrated insert 10 has a sealing ring chamber 30, in which a metal sealing ring 32 is arranged. This metal sealing ring 32 has a sealing bead 34, 36 at both its end faces. The first sealing bead 34 rests against a flat sealing face 38 at the end of the chamber 22, whereby it surrounds a termination 40 of the duct 26 into the chamber 22. (This sealing face 38 is designated "chamber sealing face" 38 below). The second sealing bead 36 rests against a flat sealing face 42 at the end of the sealing ring chamber 30, whereby it surrounds the termination of the duct 24. (This sealing face 42 is designated "second sealing face" 38 on the insert 20 below). Attention is drawn to the fact that the sealing ring chamber 30 is designed in such a way that the first sealing bead 34 of the metal sealing ring 32 does not project from the sealing ring chamber 30. Consequently it is ensured that this first sealing bead 34 is largely protected against damage before and during assembly of the insert. In this embodiment the annular chamber sealing face 38 is enclosed by an annular groove 44, into which the cylindrical wall 46 of the sealing ring chamber 30 is introduced, so that the chamber sealing face 38 can be pressed against the countersunk first sealing bead 34.

Figure 2:
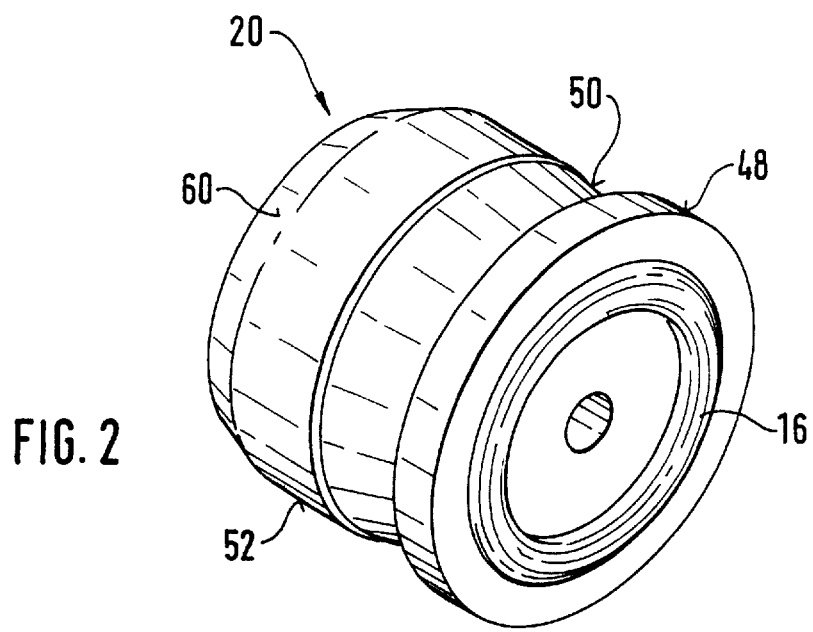
FIG. 2 a perspective view of an insert according to the invention.

As is clear in particular in FIG. 2, the insert 20 has a first cylindrical guide surface 48, a tapering clamping surface 50 expanding towards the rear and a cylindrical sealing face 52, which are arranged in this order from its end with the first sealing bead 16 to its opposite end (in which the sealing chamber 30 is arranged). The chamber 22, into which this insert 20 is introduced, is designed as a stepped bore, the cylindrical guide surface 48 being guided in a first step 54 and the cylindrical sealing face 52 sealed in a second step 56 by a radially acting sealing element 58. The diameter of the first step is greater than the diameter of the second step. The illustrated sealing element 58 is, for example, an O-ring, which is fitted in an annular groove in the second step 56. It should also be pointed out in this connection that the sealing face 52 changes into a surface 60 with a tapered bevel towards the end in order to facilitate pushing of the insert into the sealing element 58 and to protect the latter against damage during mounting of the insert 20. It should likewise be noted that introduction of the bevelled tip of the insert 20 into the sealing element 58 is facilitated by the cylindrical guidance of the guide surface 48 in the first bore step 54.

The insert 20 is advantageously held by screws 62, 64 in the chamber 22. These screws 62, 64 are screwed into suitable threaded bores in the chamber wall 66. They are advantageously diametrically opposite each other and project at right angles to the central axis 68 of the connection piece 10 into the chamber 22, where they interact with the bevelled surface 50 of the insert 20 in order to block the insert 20 in the direction of the chamber opening by the wedge effect of the bevelled surface 50, without impairing its freedom of movement in the direction of the chamber sealing face 38.

Figure 3:
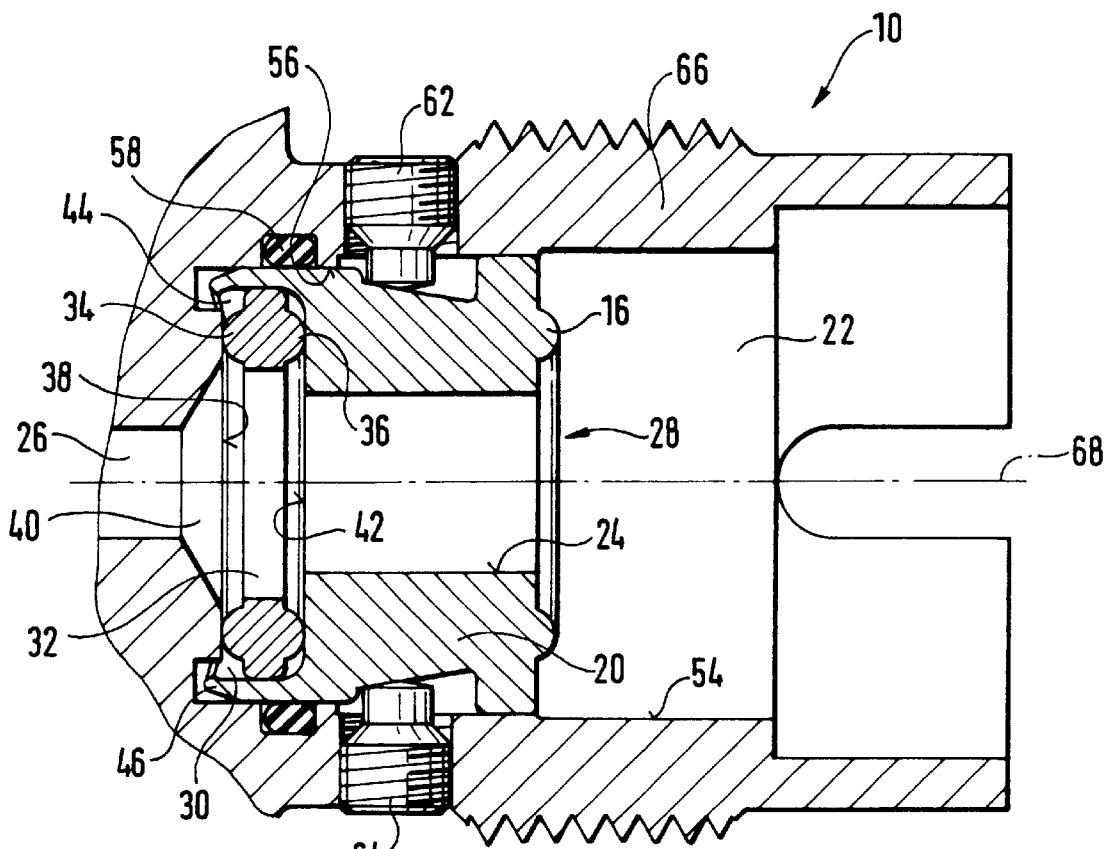
FIG. 3 a longitudinal section through the connection piece of FIG. 1 (drawn enlarged)
Figure 4:
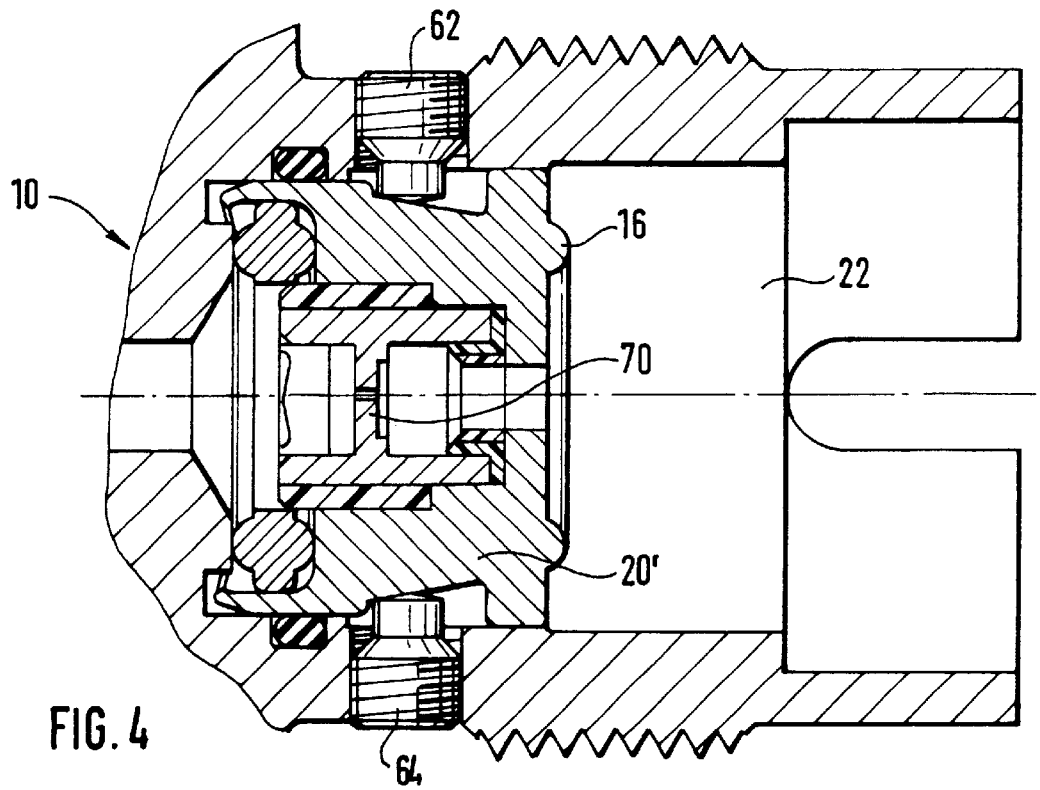
FIG. 4 a longitudinal section through a connection piece as shown in FIG. 3, but with a flow limiter.

The embodiment shown in FIG. 4 differs from that in FIG. 3 exclusively by integration of a flow limiter 70 instead of the simple through-bore 24 in the insert 20'. In the case of a cylinder valve the insert 20' is merely removed from the chamber 22 after loosening the screws 62, 64 to fill the cylinder.

Figure 8:
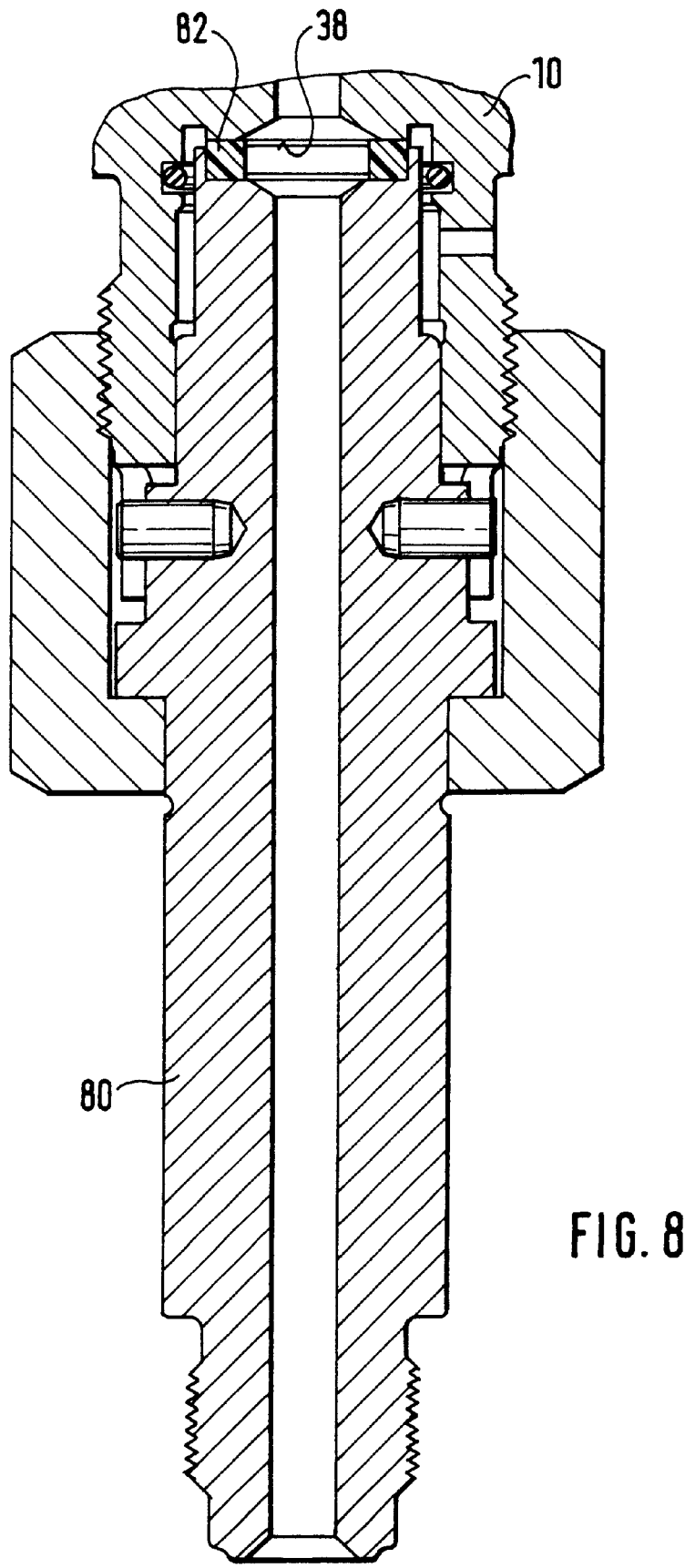
FIG 8 a longitudinal section through a connection piece with filling nipple.

FIG. 8 shows a valve connection piece 10 of a cylinder valve with a connected filling nipple 80 for filling the cylinder. It should be noted that the insert 20, 20' was removed from the chamber 22 before connection of the filing nipple. The seal between the connection piece 10 and the filling nipple 80 is advantageously effected by an axial sealing ring 82 made of plastic, which is pressed directly against the chamber sealing face 38. Consequently, damage to the sealing bead 16 during filling of the cylinder is avoided. After filling the cylinder the old insert 20, 20' or a new insert 20, 20' can be introduced into the chamber 22. If necessary, the sealing face 38 can be refinished before introduction of the insert 20, 20'. As a flat sealing face is involved, this refinishing can be carried out at low cost.

A further development of the sealing ring 32 and the sealing faces 38, 42 in FIG. 3 is described with the aid of FIGS. 5 to 7.

The sealing ring 132 differs from the sealing ring 32 in particular by an outer protective edge 100, which extends beyond each of the two sealing beads 34, 36. (In other words the sealing ring is thicker in its edge area than in the area of the sealing beads 34, 36). The end faces 102, 104 of this protective edge 100 serve as supporting surfaces until installation of the sealing ring 132 and prevent scratching of the sealing beads 36, 34, for example, when the sealing ring 132 is placed on a flat surface.

The sealing faces 138, 142 differ from the sealing faces 38, 42 by an annular groove 106 or 108 in the respective sealing faces. This annular groove 106, 108 centres the sealing ring 32 or 132 on the sealing face 106, 108. Consequently the impression of the sealing bead in the sealing face 138, 142 is always localised at exactly the same point. In the embodiment in FIG. 6 the radius R' of the rounded annular groove 106 is smaller than the radius R of the rounded sealing bead 34. The sealing bead 34 always rests against the edges 110, 112 of the annular groove 106. In the embodiment in FIG. 7 the radius R' of the rounded annular groove 108 is greater than the radius R of the rounded sealing bead 36. The sealing bead 34 always rests against the base area 114 of the annular groove 108.

Finally it should be noted that the sealing ring 32 or sealing ring 132, in particular in combination with the sealing faces in FIGS. 6 and 7, can also be introduced without insert 20, i.e. directly between the connection piece and the connection nipple. Compared to the "Outlet Connections for Ultra High Integrity Service, CGA 6301710 series" of "Compressed Gas Association, Inc.", a system of this type would have the advantage that the sealing faces are less exposed and can also be refinished without problems. The latter also applies if the sealing faces have annular grooves, as shown in FIGS. 6 and 7.

I claim:

1. A gas connection piece having a sealing face with a sealing bead, said gas connection piece comprising:
    a body with an end face and a chamber forming an opening in said end face;
    an interchangeable insert axially fitted into said chamber so as to be entirely received therein, wherein said interchangeable insert has a first end with a first annular sealing face, which faces towards said opening in said end face and forms said sealing face with said sealing bead within said chamber, and an axially opposite second end; and
    auxiliary sealing means cooperating with said second end of said interchangeable insert for fitting the latter in a sealed manner into said chamber.

2. The connection piece according to claim 1, wherein:
    said insert has a second end and a second annular sealing face on said second end;
    said body has an annular chamber sealing face in said chamber;
    said auxiliary sealing means comprises an auxiliary sealing ring having a first annular face and a second annular face, wherein said auxiliary sealing ring rests with its first annular face against said annular chamber sealing face and with its second annular face against said second annular sealing face on said insert; and
    at least one of said annular faces of said auxiliary sealing ring has a sealing bead thereon.

3. The connection piece according to claim 2, wherein said second end of said insert has a sealing ring chamber therein for receiving said auxiliary sealing ring, said first annular face of said auxiliary sealing ring has a sealing bead thereon, and said sealing ring chamber is designed in such a way that said sealing bead on said first annular face of said auxiliary sealing ring does not project from said sealing ring chamber.

4. The connection piece according to claim 3, wherein:
    said annular chamber sealing face is surrounded by an annular groove; and
    said sealing ring chamber is surround by a ring-shaped wall of said insert, which is introduced into said annular groove.

5. The connection piece according to claim 4, wherein:
    said chamber in said body has a first rotation-symmetrical surface therein;
    said insert has a second rotation-symmetrical surface thereon; and
    said auxiliary sealing means comprises a radially acting sealing element arranged between said first and said second rotation-symmetrical surface.

6. The connection piece according to claim 5, wherein:
    said chamber comprises an annular groove forming said first rotation-symmetrical surface;
    said insert has a cylindrical surface forming said second rotation-symmetrical surface.

7. The connection piece according to claim 2, comprising:
    at least one screw, which secures said insert in said chamber, said screw being screwed into said body and projecting at right angles to a central axis of said chamber, and
    a beveled surface on said insert, said beveled surface interacting with said at least one screw in such a way that said insert is blocked in the direction of said opening in said end face of said body by a wedge effect of said beveled surface.

8. The connection piece according to claim 1, wherein:
    said insert has a first cylindrical guide surface, a tapered clamping surface and a cylindrical sealing face, which are arranged in this order from its first end to its second end,
    said chamber is designed as a stepped hole comprising a first step and a second step, the diameter of said first step being greater than that of said second step;
    said cylindrical guide surface is guided in said first step; and
    said auxiliary sealing means comprises a radially acting sealing element, which seals said cylindrical sealing face in said second step.

9. The connection piece according to claim 1, comprising a flow limiter, which is integrated in said insert.

10. The connection piece according to claim 2, wherein said auxiliary sealing ring has a sealing bead on both of its annular faces.

11. The connection piece according to claim 10, wherein at least one of said annular chamber sealing face or said second annular sealing face on said insert has an annular groove for centering said sealing ring.

12. The connection piece according to claim 11, wherein said annular groove and has a concavely curved bottom surface located between two groove edges, and said sealing bead of said auxiliary sealing ring rests exclusively on said concavely curved bottom surface in said annular groove.

13. The connection piece according to claim 11, wherein said annular groove and has a concavely curved bottom surface located between two groove edges, and said sealing bead of said auxiliary sealing ring rests exclusively on said groove edges.

14. The connection piece according to claim 10, wherein said auxiliary sealing ring has a protective edge, which projects beyond said sealing beads.

15. A gas connection piece comprising:
    a body with an end face and a chamber forming an opening in said end face;
    an annular chamber sealing face in said chamber, said annular chamber sealing face including an annular groove having a concavely curved bottom surface located between two groove edges;
    a soft metal seal ring fitted into said chamber, said seal ring having a first annular face with a first sealing bead thereon, and a second annular face with a second sealing bead thereon;
    wherein said second annular face of said seal ring faces towards said opening in said end face, and said first sealing bead of said first annular face rests exclusively on said concavely curved bottom surface.

16. A gas connection piece comprising:
a body with an end face and a chamber forming an opening in said end face;
an annular chamber sealing face in said chamber, said annular chamber sealing face including an annular groove having a concavely curved bottom surface located between two groove edges;
a soft metal seal ring fitted into said chamber, said seal ring having a first annular face with a first sealing bead thereon, and a second annular face with a second sealing bead thereon;
wherein said second annular face of said seal ring faces towards said opening in said end face, and said first sealing bead of said first annular face rests exclusively on said groove edges.

17. A gas connection piece comprising:
a body with an end face and a chamber forming an opening in said end face;
an annular chamber sealing face in said chamber;
a soft metal seal ring fitted into said chamber, said seal ring having a first annular face with a first sealing bead thereon, a second annular face with a second sealing bead thereon, and an outer protective edge extending beyond each of said sealing beads, so that said seal ring is thicker in its edge area than in the area of said sealing beads;
wherein said seal ring rests with its first annular face against said annular chamber sealing face and said second annular face of said seal ring faces towards said opening in said end face.

18. A gas connection piece having a sealing face with a sealing bead, said gas connection piece comprising:
a body with an end face and a chamber opening into said end face, said chamber having an annular chamber sealing face therein;
an interchangeable insert fitted into said chamber, said interchangeable insert having a first end with a first annular sealing face, which faces towards said opening in said end face and forms said sealing face with said sealing bead within said chamber, and an axially opposite second end, which includes a sealing ring chamber with a second annular sealing face of said insert therein, which faces towards said annular chamber sealing face; and
auxiliary sealing means for fitting said interchangeable insert in a sealed manner into said chamber, said auxiliary sealing means including an auxiliary sealing ring having a first annular face and a second annular face, wherein said auxiliary sealing ring rests with its first annular face against said annular chamber sealing face and with its second annular face against said second annular sealing face of said insert;
wherein at least said first annular face of said auxiliary sealing ring has a first auxiliary sealing bead thereon, and said sealing ring chamber is designed in such a way that said first auxiliary sealing bead does not project from said sealing ring chamber.

19. The connection piece according to claim 18, wherein:
said annular chamber sealing face is surrounded by an annular groove; and
said sealing ring chamber is surround by a ring-shaped wall of said insert, which is introduced into said annular groove.

20. The connection piece according to claim 19, wherein:
said chamber in said body has a first rotation-symmetrical surface therein;
said insert has a second rotation-symmetrical surface thereon; and
said auxiliary sealing means comprises a radially acting sealing element arranged between said first and said second rotation-symmetrical surface.

21. The connection piece according to claim 20, wherein:
said chamber comprises an annular groove forming said first rotation-symmetrical surface;
said insert has a cylindrical surface forming said second rotation-symmetrical surface;
said radially acting sealing element comprises an O-ring, which is fitted in said annular groove and in sealed contact with said cylindrical surface.

22. A gas connection piece having a sealing face with a sealing bead, said gas connection piece comprising:
a body with an end face and a chamber opening into said end face, said chamber having an annular chamber sealing face therein;
an interchangeable insert fitted into said chamber, said interchangeable insert having a first end with a first annular sealing face, which faces towards said opening in said end face and forms said sealing face with said sealing bead within said chamber, and an axially opposite second end with a second annular sealing face which faces towards said annular chamber sealing face; and
auxiliary sealing means for fitting said interchangeable insert in a sealed manner into said chamber, said auxiliary sealing means including an auxiliary sealing ring having a first annular face with a first annular sealing bead and a second annular face with a second annular sealing bead, wherein said auxiliary sealing ring rests with its first annular face against said annular chamber sealing face and with its second annular face against said second annular sealing face of said insert.

23. The connection piece according to claim 22, wherein at least one of said annular chamber sealing face or said second annular sealing face on said insert has an annular groove for centering said sealing ring.

24. The connection piece according to claim 23, wherein said annular groove and has a concavely curved bottom surface located between two groove edges, and said sealing bead of said auxiliary sealing ring rests exclusively on said concavely curved bottom surface in said annular groove.

25. The connection piece according to claim 24, wherein said annular groove and has a concavely curved bottom surface located between two groove edges, and said sealing bead of said auxiliary sealing ring rests exclusively on said groove edges.

26. The connection piece according to claim 24, wherein said auxiliary sealing ring has a protective edge, which projects beyond said sealing beads.

27. A gas connection piece having a sealing face with a sealing bead, said gas connection piece comprising:
a body with an end face and a chamber opening into said end face, said chamber having an annular chamber sealing face therein;
an interchangeable insert fitted into said chamber, said interchangeable insert having a first end with a first annular sealing face, which faces towards said opening in said end face and forms said sealing face with said sealing bead within said chamber, and an axially opposite second end with a second annular sealing face, which faces towards said annular chamber sealing face;

auxiliary sealing means for fitting said interchangeable insert in a sealed manner into said chamber, said auxiliary sealing means including an auxiliary sealing ring having a first annular face and a second annular face with, wherein said auxiliary sealing ring rests with its first annular face against said annular chamber sealing face and with its second annular face against said second annular sealing face of said insert;

at least one screw, which secures said insert in said chamber, said screw being screwed into said body and projecting at right angles to a central axis of said chamber, and a beveled surface on said insert, said beveled surface interacting with said at least one screw in such a way that said insert is blocked in the direction of said end face of said body by a wedge effect of said beveled surface.

28. A gas connection piece having a sealing face with a sealing bead, said gas connection piece comprising:

a body with an end face and a chamber opening into said end face, said chamber being designed as a stepped hole comprising a first step and a second step, the diameter of said first step being greater than that of said second step;

an interchangeable insert fitted into said chamber, said interchangeable insert having a first end with a first annular sealing face, which faces towards said opening in said end face and forms said sealing face with said sealing bead within said chamber, and an axially opposite second end, said insert having a first cylindrical guide surface, a tapered clamping surface and a cylindrical sealing face, which are arranged in this order from its first end to its second end, wherein said cylindrical guide surface is guided in said first step; and auxiliary sealing means for fitting said interchangeable insert in a sealed manner into said chamber, said auxiliary sealing means including a radially acting sealing element, which seals said cylindrical sealing face in said second step.

* * * * *